United States Patent
Kim et al.

(10) Patent No.: US 9,167,451 B2
(45) Date of Patent: Oct. 20, 2015

(54) METHOD AND APPARATUS FOR MEASURING INTERFERENCE IN WIRELESS COMMUNICATION SYSTEM

(71) Applicant: LG ELECTRONICS INC., Seoul (KR)

(72) Inventors: Kijun Kim, Anyang-si (KR); Jonghyun Park, Anyang-si (KR); Jaewon Lim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 106 days.

(21) Appl. No.: 14/146,529

(22) Filed: Jan. 2, 2014

(65) Prior Publication Data

US 2014/0185483 A1 Jul. 3, 2014

Related U.S. Application Data

(60) Provisional application No. 61/748,126, filed on Jan. 2, 2013, provisional application No. 61/885,012, filed on Oct. 1, 2013.

(51) Int. Cl.
*H04W 24/02* (2009.01)
*H04L 5/00* (2006.01)

(52) U.S. Cl.
CPC ............ *H04W 24/02* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 8,837,394 B2* | 9/2014 | Lin et al. | 370/329 |
| 8,938,247 B2* | 1/2015 | Gorokhov et al. | 455/452.1 |
| 2009/0181687 A1* | 7/2009 | Tiirola et al. | 455/450 |
| 2011/0268028 A1* | 11/2011 | Stern-Berkowitz et al. | 370/328 |
| 2012/0039273 A1* | 2/2012 | Nam et al. | 370/329 |
| 2012/0044906 A1* | 2/2012 | Chen et al. | 370/329 |
| 2012/0106471 A1* | 5/2012 | Behravan et al. | 370/329 |
| 2012/0163320 A1* | 6/2012 | Akimoto et al. | 370/329 |
| 2012/0257582 A1* | 10/2012 | Damnjanovic et al. | 370/329 |
| 2013/0188580 A1* | 7/2013 | Dinan | 370/329 |
| 2014/0119321 A1* | 5/2014 | Wang et al. | 370/329 |

* cited by examiner

*Primary Examiner* — Brian Roberts
(74) *Attorney, Agent, or Firm* — Birch, Stewart, Kolasch & Birch, LLP

(57) ABSTRACT

A method and apparatus for measuring inter-cell measurement in a wireless communication system are discussed. The method includes: receiving information regarding a predetermined resource region to which a sounding signal allocated for user equipments (UEs) connected to base stations (BSs) contained in the same coordinated cluster is transmitted, the sounding signal being used to detect a UE causing inter-cell interference; determining whether transmission of the sounding signal is granted for a serving UE in the predetermined resource region; and if transmission of the sounding signal is granted, transmitting a transmission grant message of the sounding signal to the serving UE, wherein whether the sounding signal transmission is granted is determined based on a random number, or is determined based on information of an available resource region of each BS if information regarding the available resource region of each BS is received with the information regarding the predetermined resource region.

17 Claims, 6 Drawing Sheets

METHOD AND APPARATUS FOR MEASURING INTERFERENCE IN WIRELESS COMMUNICATION SYSTEM

CROSS REFERENCE TO RELATED APPLICATIONS

This nonprovisional application claims the benefit of U.S. Provisional Application Nos. 61/748,126 and 61/885,012 filed respectively on Jan. 2, 2013 and Oct. 1, 2013. The entire contents of the above applications are hereby incorporated by reference.

TECHNICAL FIELD

The present invention relates to a method and apparatus for measuring interference in a wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

However, assuming that coordinated scheduling between multiple nodes is not achieved in the multi-node system, advantages of the multi-node system will be reduced due to interference among the multiple nodes. Specifically, the aforementioned problems become more serious in a wireless communication system in which small cells such as a pico cell or a femto cell are distributed. Accordingly, a method for measuring the inter-cell interference under the small-cell environment is needed.

DISCLOSURE

Technical Problem

An object of the present invention is to provide a method for measuring inter-cell interference in a wireless communication system.

The technical problems to be solved by the present invention are not limited to the above technical problems and those skilled in the art may understand other technical problems from the following description.

Technical Solution

The objects of the present invention can be achieved by providing a method for measuring inter-cell interference in a wireless communication system includes: receiving information regarding a predetermined resource region to which a sounding signal allocated for user equipments (UEs) connected to base stations (BSs) contained in the same coordinated cluster is transmitted, the sounding signal being used to detect a UE causing inter-cell interference; determining whether transmission of the sounding signal is granted for a serving UE in the predetermined resource region; and if transmission of the sounding signal is granted, transmitting a transmission grant message of the sounding signal to the serving UE, wherein whether the sounding signal transmission is granted is determined on the basis of a random number, or is determined on the basis of information of an available resource region of each BS if information regarding the available resource region of each BS is received with the information regarding the predetermined resource region.

Preferably, the determining whether transmission of the sounding signal is granted may include: generating a random number within a predetermined range; and comparing the random number with a threshold value, wherein, if the random number is lower than the threshold value, transmission of the sounding signal is granted.

Preferably, the threshold value may be BS-specifically changed.

Preferably, the threshold value may increase in proportion to the number of UEs served by the BS.

Preferably, the method may further include: receiving a measurement result for the sounding signal from a neighbor BS.

Preferably, the measurement result may be received when reception (Rx) power of the sounding signal is equal to or higher than a predetermined level, and includes a reception (Rx) power level, time/frequency resources, and sequence information of the received sounding signal.

Preferably, the method may further include: allocating radio resources not used by the neighbor BS to the serving UE having transmitted the sounding signal.

Preferably, the method may further include: if transmission of the sounding signal is not granted, attempting to detect a sounding signal transmitted from a UE served by neighbor BSs in the predetermined resource region.

In accordance with another aspect of the present invention, a base station (BS) for measuring inter-cell interference in a wireless communication system includes: a radio frequency (RF) unit; and a processor configured to control the RF unit, wherein the processor receives information regarding a predetermined resource region to which a sounding signal allocated for user equipments (UEs) connected to base stations (BSs) contained in the same coordinated cluster is transmitted, the sounding signal being used to detect a UE causing inter-cell interference; determines whether transmission of the sounding signal is granted for a serving UE in the predetermined resource region; and if transmission of the sounding signal is granted, transmits a transmission grant message of the sounding signal to the serving UE, wherein specific information indicating whether the sounding signal transmission is granted is determined on the basis of a random number, or is determined on the basis of information of an available resource region of each BS if information regarding the available resource region of each BS is received with the information regarding the predetermined resource region.

Preferably, the processor may generate a random number within a predetermined range, and compare the random number with a threshold value, wherein, if the random number is lower than the threshold value, transmission of the sounding signal is granted.

Preferably, the threshold value may be BS-specifically changed.

Preferably, the threshold value may increase in proportion to the number of UEs served by the BS.

Preferably, the processor may be configured to receive a measurement result for the sounding signal from a neighbor BS.

Preferably, the measurement result may be received when reception (Rx) power of the sounding signal is equal to or higher than a predetermined level, and include a reception (Rx) power level, time/frequency resources, and sequence information of the received sounding signal.

Preferably, the processor may be configured to allocate radio resources not used by the neighbor BS to the serving UE having transmitted the sounding signal.

Preferably, if transmission of the sounding signal is not granted, the processor may be configured to attempt to detect a sounding signal transmitted from a UE served by neighbor BSs in the predetermined resource region.

In accordance with another aspect of the present invention, a user equipment (UE) for measuring inter-cell interference in a wireless communication system includes: a radio frequency (RF) unit; and a processor configured to control the RF unit, wherein the processor is configured to receive a transmission grant message of a sounding signal for detecting a user equipment (UE) causing inter-cell interference from a serving base station (BS), and is configured to transmit the sounding signal according to the transmission grant message, wherein the transmission grant message indicates transmission of the sounding signal within a predetermined resource region to which a sounding signal allocated for UEs served by BSs contained in the same coordinated cluster is transmitted, and the transmission grant message is determined on the basis of a random number, or is determined on the basis of information of an available resource region of each BS if information regarding the available resource region of each BS is received with the information regarding the predetermined resource region.

The above description corresponds to part of embodiments of the present invention and various embodiments reflecting technical characteristics of the present invention are derived and understood by those skilled in the art on the basis of the following detailed description of the present invention.

Advantageous Effects

As is apparent from the above description, exemplary embodiments of the present invention can control or reduce inter-cell interference in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
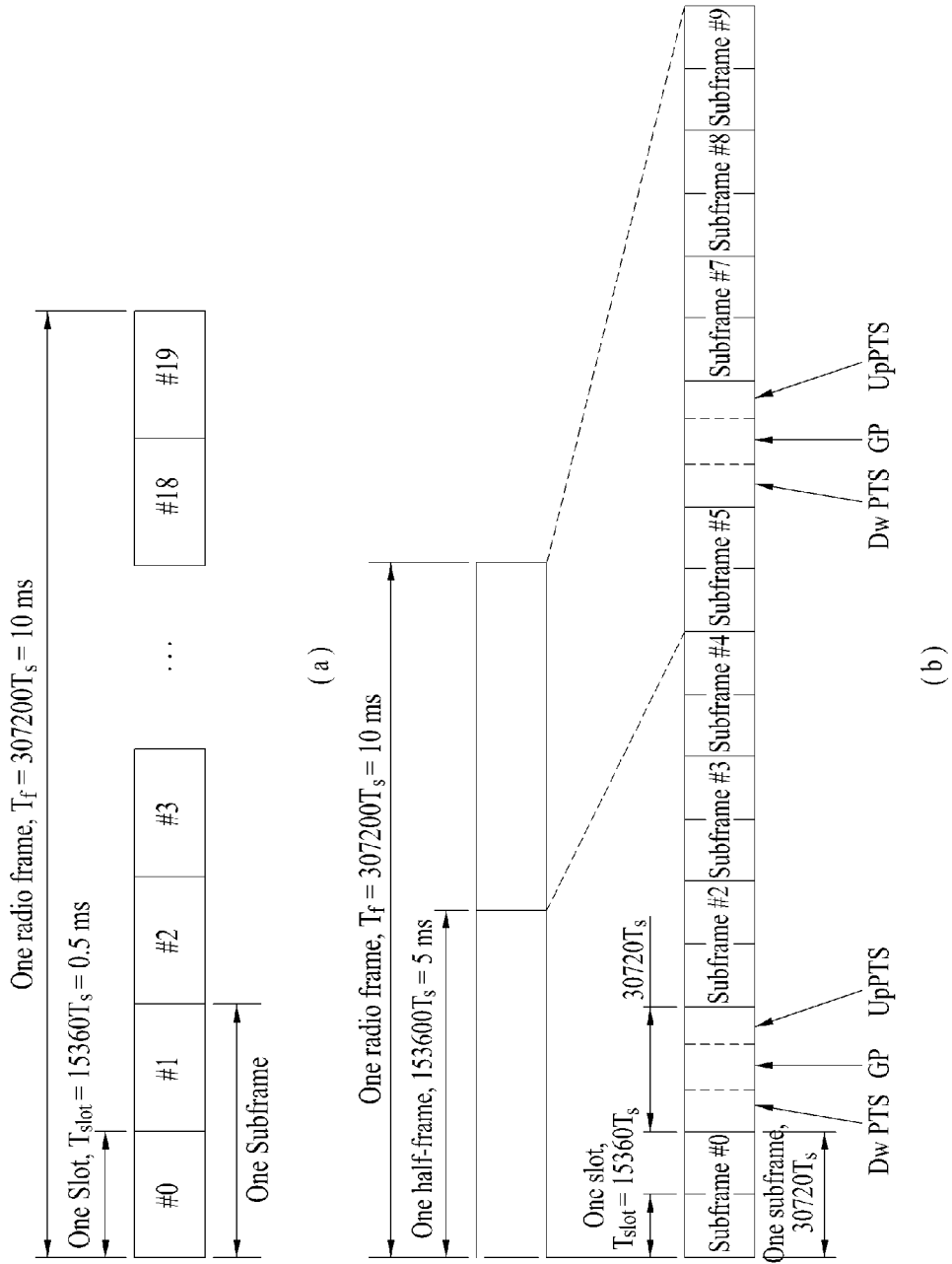
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
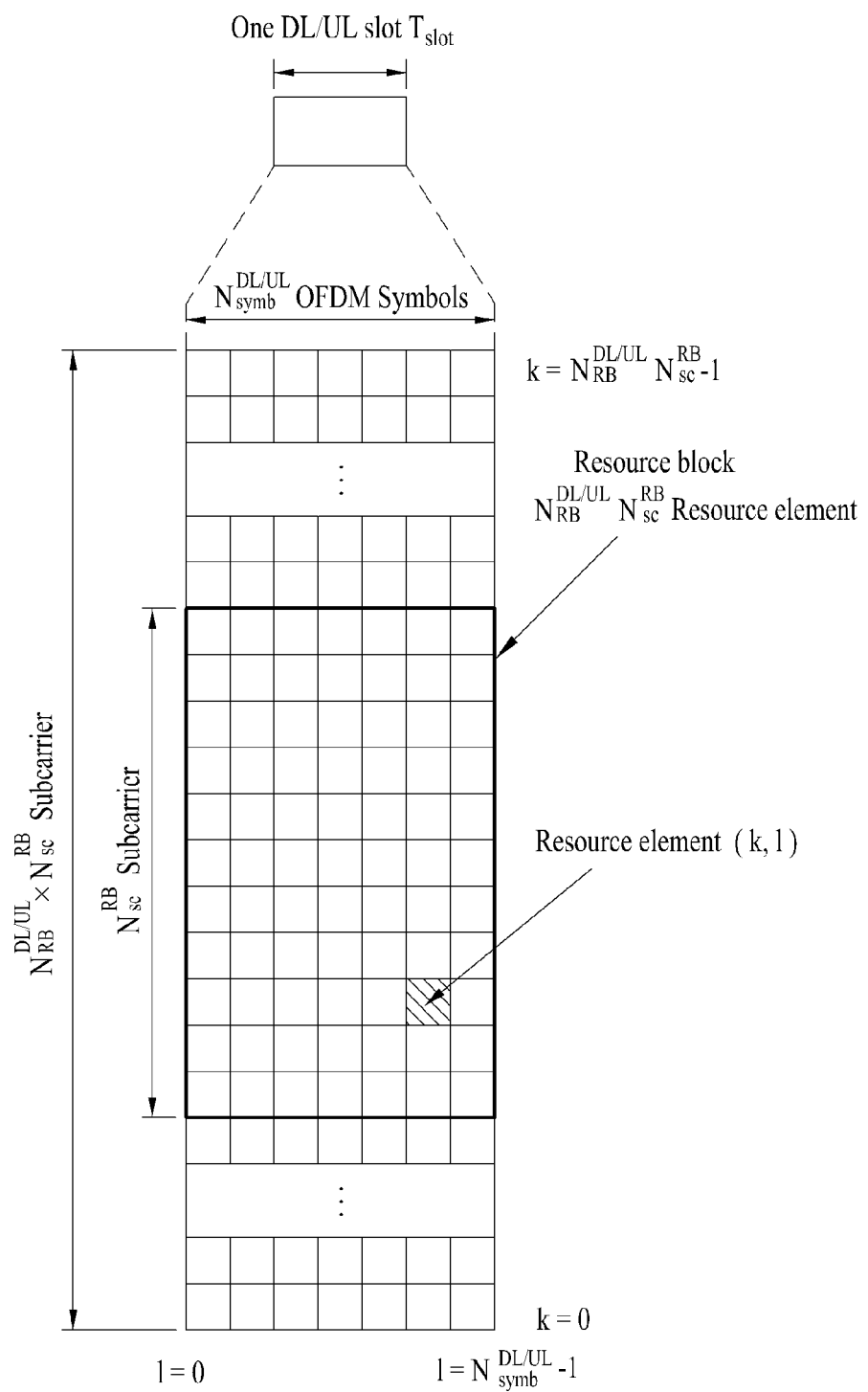
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ RB subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
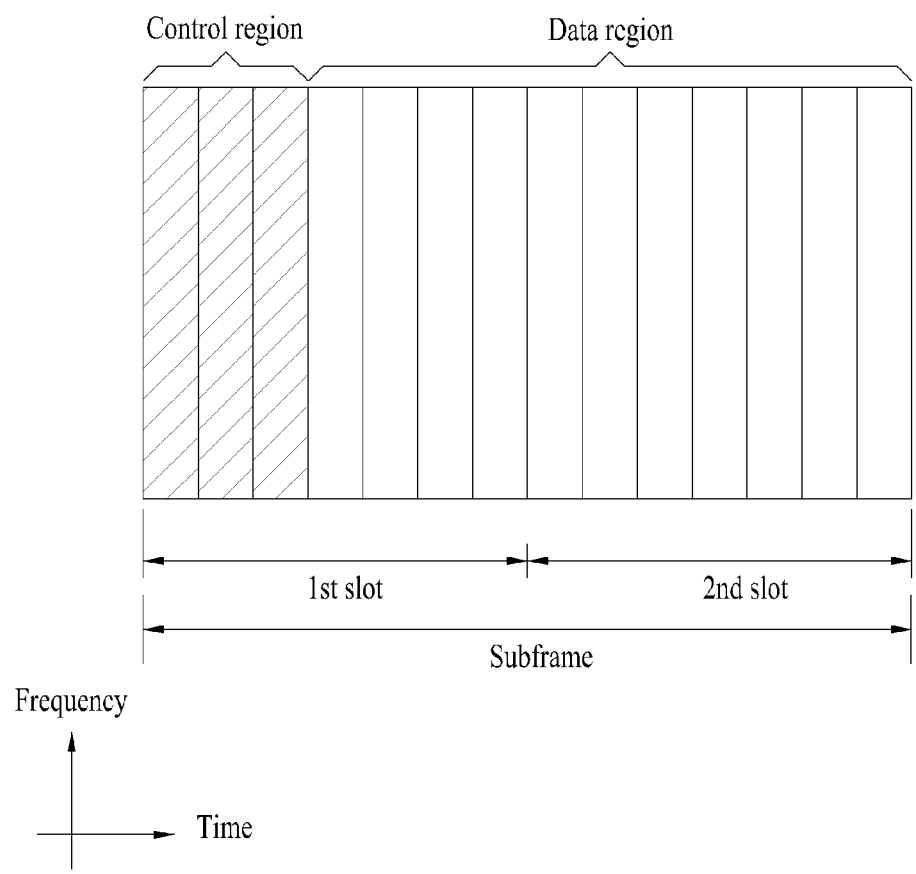
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
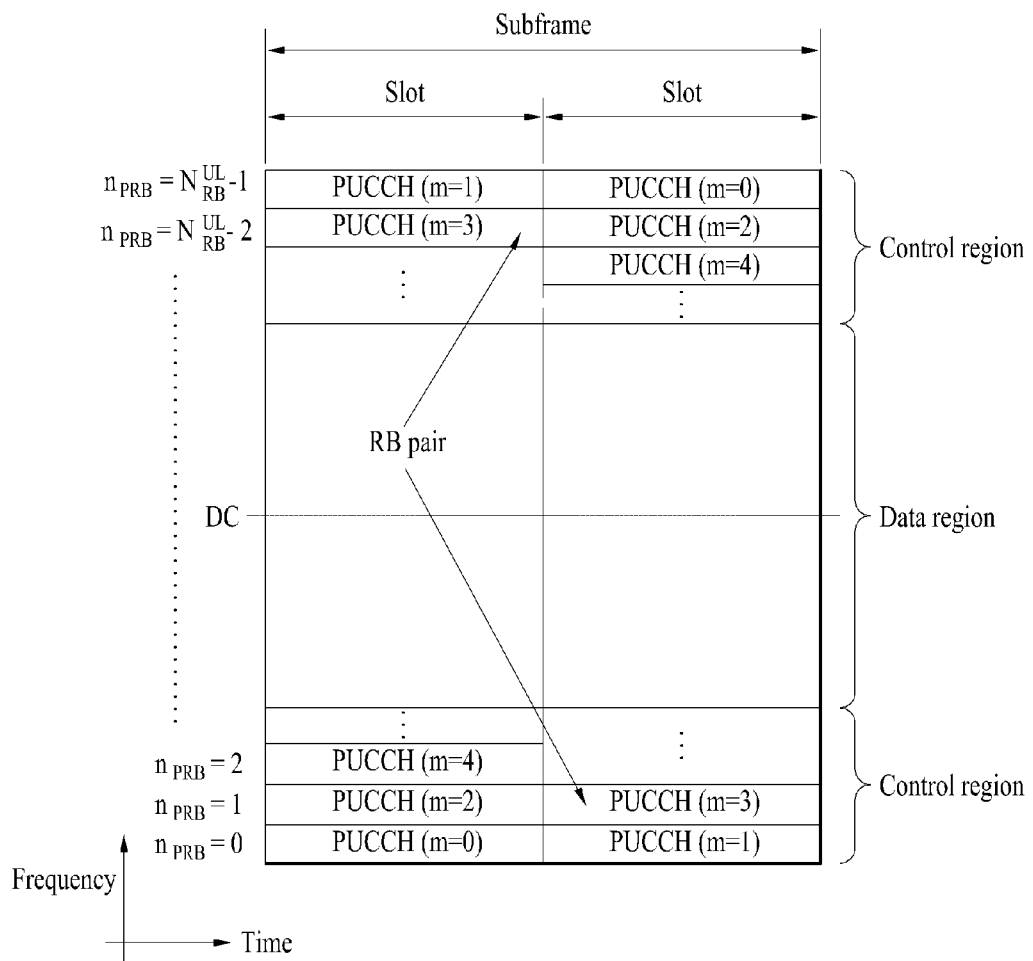
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data. The control region and the data region may be referred to a PUCCH region and a PUSCH region, respectively. The data region may be allocated a sounding reference signal (SRS). The SRS may be transmitted in the last OFDM symbol in a UL subframe in a time-domain, and a data transmission region, that is a data region of the UL subframe. SRSs for one or more UEs, which are transmitted/received in the last OFDM symbol of the same subframe, may be differentiated based on frequency location/sequence.

If a UE uses SC-FDMA scheme for uplink transmission in a LTE system according to 3GPP LTE release 8 or 9, a PUCCH and a PUSCH may not be transmitted simultaneously in a carrier in order to maintain a characteristic of a single carrier. In a LTE system according to 3GPP LTE release 10, whether or not simultaneous transmission of a PUCCH and a PUSCH is available may be indicated by a higher-layer.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE/LTE-A.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2 PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Carrier Aggregation

Figure 5:
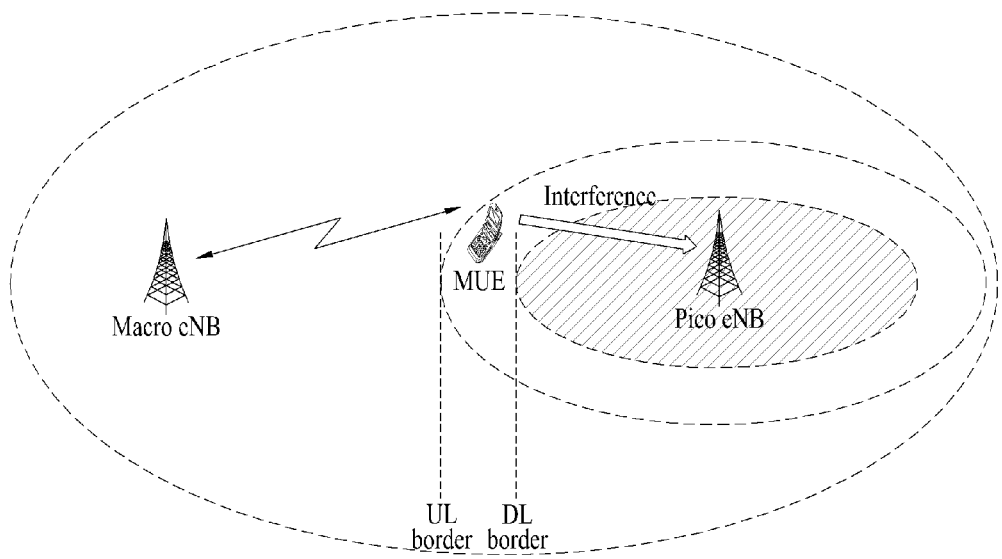
FIG. 5 is a conceptual diagram illustrating an exemplary situation in which UL interference is applied to a neighbor BS (or eNB) of a specific UE according to one embodiment.

FIG. 5 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and a uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 5. CA is a technology introduced to use a wider band to meet demands for a high transmission rate. CA can be defined as aggregation of two or more component carriers (CCs) having different carrier frequencies. FIG. 5(a) shows a subframe when a conventional LTE system uses a single CC and FIG. 5(b) shows a subframe when CA is used. In FIG. 5(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 6:
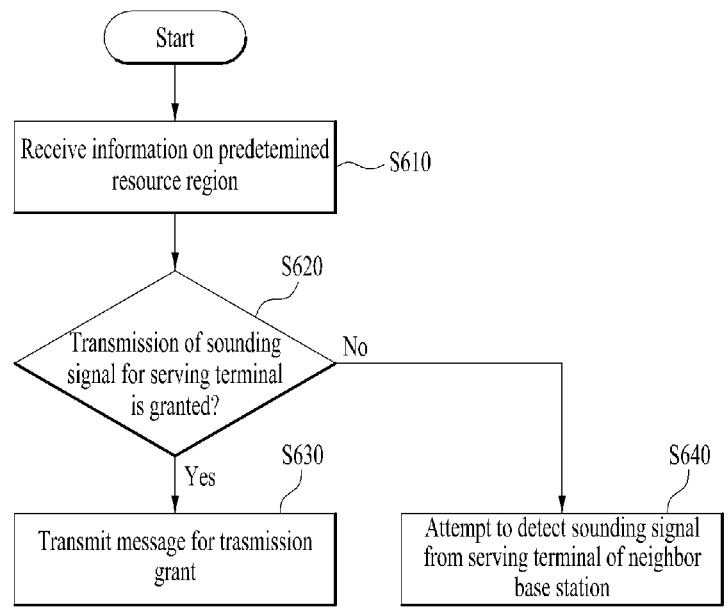
FIG. 6 is a flowchart illustrating a method for controlling interference according to one embodiment.

FIG. 6 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 6, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling. When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 6, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, the ACK/NACK information cannot be successfully transmitted using the above mentioned ACK/NACK bundling or multiplexing when the number of ACK/NACK bits to be transmitted is greater than the number of ACK/NACK bits that can be supported by ACK/NACK bundling or multiplexing.

An almost blank subframe (ABS) is a scheme for performing transmission according to a predetermined time pattern in order to mitigate interference between neighboring cells (or eNBs). According to the ABS based scheme, an aggressor cell, which may cause interference in communication of neighboring cells, can previously transmit an ABS pattern corresponding to a transmission pattern thereof to victim cells, the victim cells can mitigate interference from the aggressor cell by actively using subframes designated as ABSs by the aggressor cell for communication with UEs linked thereto, and cell detection performance and cell maintenance performance of the UEs linked to the victim cells can be improved.

The ABS will now be described in more detail.

A description will be given of ABS related signaling through an X2 interface used for communication between eNBs. To make good use of the ABS, an eNB sets restricted measurement for a UE and transmits two different ABS based measurement sets to the UE for restricted measurement. That is, upon reception of an ABS pattern of a neighboring cell, particularly, an aggressor cell through the X2 interface, the eNB configures measurement sets for the UE linked thereto on the basis of an ABS pattern thereof. In 3GPP LTE, a UE needs to measure a CRS in all subframes in order to select an MCS, RI and PMI. However, when the neighboring cell sets an ABS and does not transmit a downlink signal or transmits the downlink signal with reduced power in the corresponding subframe, as described above, the UE needs to perform subframe-specific measurement since interference depends on the ABS pattern. To achieve this, the eNB instructs a specific UE to measure a specific subframe and the UE performs subframe-specific measurement. This is called restricted measurement. For this operation, when a specific cell sets some subframes as ABSs, corresponding information needs to be transmitted through X2 interface between eNBs. ABS signaling defined in 3GPP LTE-A includes ABS information and ABS state.

The ABS information is shown in FIG. 3. The ABS information represents a subframe to be used as an ABS as a bitmap and corresponds to a 40-bit bitmap in FDD and a maximum 70-bit bitmap depending on UL-DL configuration in TDD. In the case of FDD, 40 bits represent 40 subframes, a bit value 1 indicates an ABS and 0 indicates a non-ABS. When restricted measurement is set for a UE, the number of CRS antenna ports of a corresponding cell is signaled to the UE for CRS measurement. A measurement subset is a subset of ABS Pattern Info and corresponds to a recommended kind of restricted measurement set for setting restricted measurement for a UE. The measurement subset is represented as a 40-bit bitmap in FDD and as a maximum 70-bit bitmap in TDD.

TABLE 3

| IE/Group Name | Presence | Range | IE type and reference | Semantics description |
| --- | --- | --- | --- | --- |
| CHOICE ABS Information | M | — | — | — |
| >FDD | | | | |
| >>ABS Pattern Info | M | | BIT STRING (SIZE(40)) | Each position in the bitmap represents a DL subframe, for which "1" indicates 'ABS' and "0" indicates 'non-ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, ...) | P (number of antenna ports for cell-specific reference signals) |
| >>Measurement Subset | M | | BIT STRING (SIZE(40)) | Indicates a subset of the ABS Pattern Info above, and is used to configure specific measurements towards the UE. |
| >TDD | | | — | — |

TABLE 3-continued

| IE/Group Name | Presence | Range | IE type and reference | Semantics description |
|---|---|---|---|---|
| >>ABS Pattern Info | M | | BIT STRING (1 . . . 70, . . . ) | Each position in the bitmap represents a DL subframe for which "1" indicates 'ABS' and "0" indicates 'non-ABS'. The maximum number of subframes depends on UL/DL subframe configuration. The maximum number of subframes is 20 for UL/DL subframe configurations 1~5; 60 for UL/DL subframe configuration 6; 70 for UL/DL subframe configuration 0. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 4 shows ABS status IE. The ABS status IE is used to assist an eNB in determining whether or not to change the ABS pattern thereof. Usable ABS Pattern Info is bitmap information corresponding to a subset of ABS Pattern Info and indicates whether a subframe designated as an ABS has been successfully used for interference control or not. DL ABS status represents the ratio of the number of RBs allocated to a UE, which need to be protected through an ABS, to the number of DL RBs scheduled in a subframe indicated by Usable ABS Pattern Info and corresponds to information indicating whether the ABS has been successfully used for the purpose thereof in a victim cell.

TABLE 4

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | | |
| >>Usable ABS | M | | BIT STRING | Each position in the |

TABLE 4-continued

| IE/Group Name | Presence | Range | IE type and reference | Semantics description |
|---|---|---|---|---|
| Pattern Info | | | (SIZE(40)) | bitmap represents a subframe, for which "1" indicates 'ABS that has been designated as protected from inter-cell interference by the eNB1, and available to serve this purpose for DL scheduling in the eNB2' and "0" is used for all other subframes. The pattern represented by the bitmap is a subset of, or the same as, the corresponding ABS Pattern Info IE conveyed in the LOAD INFORMATION message from the eNB1. |
| >TDD | | | — | — |
| >>Usable ABS Pattern Info | M | | BIT STRING (1 ... 70) | Each position in the bitmap represents a subframe, for which "1" indicates 'ABS that has been designated as protected from inter-cell interference by the eNB1, and available to serve this purpose for DL scheduling in the eNB2' and "0" is used for all other subframes. The pattern represented by the bitmap is a subset of, or the same as, the corresponding ABS Pattern Info IE conveyed in the LOAD INFORMATION message from the eNB1. |

As described above, a measurement subset corresponding to a subset of an ABS pattern is a subframe statically used as an ABS and an eNB can determine whether other subframes included in the ABS pattern can be used as ABSs according to traffic load.

The following table shows invoke an indication IE. Invoke indication can be used when a specific eNB requests information of a specific type from a neighboring eNB. When the neighboring eNB performs ABS operation, invoke information can be used to request the neighboring eNB to provide ABS information on an ABS pattern set therefor.

TABLE 5

| IE/Group Name | Presence | Range | IE type and reference | Semantics description |
|---|---|---|---|---|
| Invoke Indication | M | | ENUMERATED (ABS Information, ...) | — |

As described above, when a plurality of cells in an interfering relationship predetermines transmission patterns thereof through co-scheduling, a UE located at a position where the UE can communicate with all the cells can communicate with a specific cell at the time when the specific cell can perform transmission and reception. Accordingly, the UE can achieve communication with the plurality of cells by arranging transmission/reception times thereof according to the transmission patterns of the cells. Here, the UE can perform communication with the plurality of cells by pre-establishing connection with the cells such that transmission/reception times with respect to the cells do not overlap.

The above-described ABS is a solution to inter-cell interference, which is applicable in the time domain. A description will be given of a solution to inter-cell interference, which can be applied in the frequency domain as well as the time domain.

Inter-cell interference coordination for frequency resources will be described hereinafter. In 3GPP LTE (Rel-8), an allocated frequency domain can be divided into one or more sub-frequency domains (e.g. PRBs) and the following indicators with respect to each sub-frequency domain can be exchanged between cells.

RNTP (relative narrowband transmission power): RNTP is an indicator that indicates downlink transmit power used by a cell transmitting an ICIC message in a corresponding sub-frequency domain. For example, when the RNTP field is set to 0 in a specific sub-frequency domain, this means that downlink transmit power does not exceed a threshold. When the RNTP field is set to 1, this means that downlink transmit power cannot be allotted.

UL IOI (uplink interference overload indication): UL IOI is an indicator that indicates the quantity of uplink interference that a cell transmitting an ICIC message suffers in a corresponding sub-frequency domain. For example, when the UL IOI field is set to a high value in a specific sub-frequency domain, this means that the cell suffers severe uplink interference in the sub-frequency domain. In this case, a cell that has received the ICIC message can schedule a UE using low uplink transmit power from among UEs served thereby in the sub-frequency domain in which the UL IOI field indicates high interference in order to mitigate interference applied to the cell transmitting the ICIC message.

UL HII (uplink high interference indication): UL HII is an indicator that indicates uplink interference sensitivity with respect to a corresponding sub-frequency domain from a cell transmitting an ICIC message. For example, when the UL HII field is set to 1 in a specific sub-frequency domain, this means that there is possibility that the cell transmitting the ICIC message schedules a UE using high uplink transmit power in the corresponding sub-frequency domain. On the contrary, if the UL HII field is set to 0 in a specific sub-frequency domain, this means that there is possibility that the cell transmitting the ICIC message schedules a UE using low uplink transmit power in the corresponding sub-frequency domain. In this case, a cell that has received the ICIC message can schedule UEs that can successfully operate even under high interference in a sub-frequency domain in which UL HII is set to 1 while preferentially using a sub-frequency domain in which UL HII is set to 0 for UE scheduling in order to avoid interference from the cell transmitting the ICIC message.

In 3GPP LTE, a frequency-domain inter cell interference coordination (ICIC) method and a time-domain ICIC method are defined as a method for mitigating inter-cell interference at a carrier of a specific frequency band. A method for mitigating interference when interference occurs at a specific carrier when multiple frequency carriers are used for current Carrier-Based ICIC (CB-ICIC) has been defined in 3GPP LTE. In addition, a method for mitigating interference caused by a difference between inter-cell Tx powers when cells having various transmission (Tx) powers are arranged in 3GPP LTE has been discussed as a major issue. In this case, if the cells having various Tx powers are arranged in the entire network, this network is referred to as a heterogeneous network (HetNet).

Specifically, when a UE communicating with a specific cell generates uplink (UL) interference in a neighbor cell, the operation for enabling the network to recognize which UE has generated the interference is very important for Inter-Cell Interference Coordination (ICIC) for interference mitigation. However, under the HetNet situation in which a Macro UE (MUE) connected to a macro cell having high Tx power applies UL interference to a small cell having relatively low Tx power, the MUE applies UL interference to the corresponding small cell due to unbalance in size between UL coverage and UL coverage of the small cell and does not receive a DL signal of the small cell capable of detecting the small cell receiving the interference from the MUE, such that the MUE may not recognize the fact that the MUE applies interference to the small cell. The reason of unbalance in size between UL coverage and DL coverage of the small cell is that it is difficult for a DL signal of the small cell to be applied to a UE at a cell edge of the small cell due to interference caused by a strong DL signal of the macro cell. In this case, since the macro cell cannot recognize which one of MUEs connected to the macro cell causes interference to the small cell, control for interference mitigation cannot be applied to the UE causing interference so as to mitigate interference applied to the small cell. If the macro cell can recognize which one of MUEs connected to the macro cell has occurred interference in the small cell, resources not used by the small cell are allocated to the corresponding UE so that no interference occurs in the small cell.

In order to search for an aggressor MUE causing interference to the small cell, potential or candidate aggressor MUEs, which may serve as the aggressor MUEs, may transmit a UL signal received by the small cell receiving interference so as to recognize which MUE has transmitted the corresponding signal. The small cell receives the UL signal from the potential or candidate aggressor MUEs, such that it can recognize which UE has transmitted the corresponding signal and also recognize the intensity of signal, such that a UE having transmitted a signal of higher than a specific threshold value may be determined to be an aggressor UE causing interference.

However, the UL signals of the potential or candidate aggressor MUEs may be interfered with data transmission from other UEs or BS. Such interference may deteriorate the accuracy in finding the aggressor MUE.

FIG. 5 is a conceptual diagram illustrating an exemplary case in the MUE causes interference to a pico eNB serving as a neighbor small cell under the HetNet situation. In this case, it is impossible for the MUE to receive a DL signal from the pico eNB because the MUE is located outside of a DL coverage of the pico eNB, and the MUE cannot recognize the presence of the pico eNB located close to the MUE. Therefore, since the macro eNB or MUE cannot recognize the fact that the MUE causes interference to the pico eNB, the method for mitigating interference cannot be applied to the macro eNB or MUE.

In accordance with the inventive method of the embodiment, in order to search for the aggressor MUE causing interference to the small cell according to one embodiment, the potential or candidate aggressor MUEs, serving as the aggressor MUEs, may transmit a specific UL signal (hereinafter referred to as a signal for MUE detection) to the small cell, the small cell receives the MUE detection signal so as to detect the potential or candidate aggressor MUE, such that the small cell can receive the MUE detection signal without interfering with UL signals of other UEs.

That is, according to the proposed method, radio resources allocated to the potential or candidate MUE configured to transmit the MUE detection signal are not used by other neighbor UEs or eNBs, such that the small cell can receive the MUE detection signal without interfering with other signals.

If interference occurs in a specific radio resource used by the small cell so that an interference indicator is transmitted to a macro cell, the macro cell may determine a potential or candidate aggressor MUE, which has the possibility of causing interference, from among MUEs connected to the macro cell. For detection of the aggressor MUE, scheduling information of the MUE detection signal to be transmitted from the corresponding potential or candidate aggressor MUE is transmitted to the small cell.

Scheduling information regarding the MUE detection signal to be transmitted from the potential or candidate aggressor MUE may be changed according to which one of signal types will be transmitted as the MUE detection signal from the potential or candidate aggressor MUE, and configuration information of the corresponding signal transmission may satisfy a signal configuration format of the legacy LTE, or may be newly designed as necessary. In this case, irrespective of specific information indicating which signal has been transmitted as the MUE detection signal from the MUE, scheduling information may include time-frequency radio block (RB) allocation information to be used for common signal transmission, a start time of signal transmission, an end time of signal transmission, a signal transmission period for periodic signal transmission.

Before searching for the aggressor MUE that actually causes interference to neighbor cells, the macro cell may search for the potential or candidate aggressor MUEs. However, this patent application does not describe a method for searching for the aforementioned potential or candidate aggressor MUEs.

A) Method for Mitigating Interference of Neighbor UE and BS in Association with UL Signal for Searching for Potential or Candidate Aggressor MUE A method for mitigating interference regarding a UL signal (i.e., signal for MUE detection) of the potential or candidate aggressor MUE according to one embodiment may be classified into a first method in which radio resources for the MUE detection signal transmitted from the potential or candidate aggressor MUE are fixed and a second method in which the radio resources for the MUE detection signal are variable.

In accordance with the first method, specific radio resources needed when the potential or candidate aggressor MUE transmits the MUE detection signal during a predetermined time are fixedly allocated. The radio resources allocated for the above usage should not be used for data transmission by neighbor UEs. The radio resources allocated for the above usage may be a subframe or resource block (RB) unit according to the size of radio resources. Information regarding the MUE dedicated resources (hereinafter referred to as MUE dedicated resource information) may be transmitted to neighbor cells such that UEs of the neighbor cell cannot use radio resources (hereinafter referred to MUE dedicated resources) allocated for the above usage during a predetermined time. The neighbor cells having received the MUE dedicated resource information may schedule the dedicated radio resources not to be used for UL transmission of UEs connected to the neighbor cells. A method for enabling the UE of the neighbor cells not to use the MUE dedicated resources after the potential or candidate aggressor MUE allocates MUE dedicated resources needed for transmission of the MUE detection signal may be defined as a method for muting the corresponding resources.

In accordance with the method for muting such fixed radio resources, configuration information needs to be exchanged between the cells during a relative long period, such that the configuration information may be used when an X2 interface used for transmission of a control signal between the cells does not exist or when it is difficult to construct the X2 interface using a dedicated network. In addition, the above-mentioned method can also be used even when network overhead increase to transmit the corresponding signal configuration information to a plurality of associated cells because many cells are arranged in the corresponding network. In this case, if muting is performed on a subframe basis, MUE dedicated resource information regarding the potential or candidate aggressor MUE may include specific information indicating which one of subframes was allocated for MUE detection signal transmission of the potential or candidate aggressor MUE in a radio frame of a specific System Frame Number (SFN). If muting is performed on an RB basis, the MUE dedicated resource information regarding the potential or candidate aggressor MUE may include not only the above-mentioned subframe information but also resource allocation information of the RB allocated in the corresponding subframe.

In accordance with the second method, during a predetermined time needed when the potential or candidate aggressor MUE transmits the MUE detection signal, MUE dedicated resources may be dynamically changed by inter-cell coordination. In accordance with the second method differently from the first method, through mobile communication core network or inter-cell coordination, the size of necessary radio resources and the frequency-time position may be changed according to the number of potential or candidate aggressor MUEs and the types of Tx signals used to facilitate transmission of the MUE detection signal in each potential or candidate aggressor MUE. That is, according to the second method, when the potential or candidate aggressor MUEs can dynamically change a conventional signal transmission state of each UE and the type of a signal to be transmitted according to UE capability, radio resources needed for transmission of the MUE detection signal of each UE may be dynamically contained in the muted radio resources obtained by legacy inter-cell coordination.

Assuming that multiple potential or candidate aggressor MUEs for use in the first method and the second method transmit the MUE detection signal, the MUE detection signals are scheduled not to use the same resources, such that no interference should occur between the MUE detection signals. For this purpose, the MUE dedicated resource information of the potential or candidate aggressor MUE is transmitted to the neighbor cells having a possibility of causing interference to the MUE detection signal, such that not only a UE connected to the corresponding cell but also the corresponding cell may not use the MUE dedicated resources.

B) Resource Allocation According to Signal Types for Interference Detection and Interference Mitigation Method for Each Signal Type When the potential or candidate aggressor MUE transmits the MUE detection (or identification) signal, one of three signaling schemes (i.e., random access preamble, Sounding Reference Signal (SRS), Demodulation Reference Signal (DMRS)) may be selected and transmitted as signal transmission methods available to the LTE system. According to types of respective signals, a method for allocating radio resources for the corresponding signal and its associated muting method may be changed according to signal categories.

B-1) Interference Mitigation Method when Random Access Preamble Scheme is Used for Detection of Aggressor MUE The LTE FDD system may have different configurations according to the length of a random access preamble sequence capable of being transmitted by a UE within a specific cell. In this case, a CP and a guard period may be configured along with the preamble sequence. If the length of resources (preamble sequence+CP+guard period) used for the random access preamble is selected in the range from 1 ms to 3 ms. Thus, if a long preamble sequence is used, a receiver can increase reception (Rx) energy of the preamble so that the receiver can more accurately receive signals. The position of random access preamble configuration and a time-frequency resource position region to which the random access preamble will be transmitted may be differently determined according to cells. In addition, according to the dedicated random access scheme, if a target cell to which the UE will be shifted due to handover or the like needs to receive the random access preamble from the UE, a specific preamble sequence is monopolistically allocated to the corresponding UE, such that the target cell receives the corresponding signal and recognizes a signal of the UE.

That is, for detection of the aggressor MUE proposed by the present invention, when the potential or candidate aggressor MUE transmits the random access preamble, the dedicated random access scheme may be used as necessary. In this case, the potential or candidate aggressor MUE transmits dedicated radio resources for transmitting the random access preamble to the potential or candidate aggressor MUE, and the macro cell transmits associated information (i.e., the position of allocated resource resources, a sequence of the random access preamble, random access preamble configuration information indicating the length of the random access preamble sequence, and a transmission time of the random access preamble) to a pico cell and the neighbor cells, such that the radio resources allocated to the potential or candidate aggressor MUE configured to transmit the random access preamble at the corresponding time are not used. That is, the neighbor cells including the pico cell may control a UE connected to the neighbor cells not to use the dedicated radio resources during a predetermined time. In addition, Tx power information of a random access preamble transmitted from the potential or candidate aggressor MUE is notified to the pico cell, and the pico cell can recognize how much Rx power on the basis of Tx power has been used for random access preamble reception of the pico cell, such that the Tx power information may be used for detection of the aggressor MUE. That is, a potential or candidate MUE having relatively lower attenuation degree of Rx power as compared to the attenuation degree of Tx power may be selected as an aggressor MUE.

A detailed description of the random access resources is as follows. Random access resources used in one cell may have a bandwidth corresponding to 6 resource blocks (RBs), and the 6 RBs may be cell-specifically decided. That is, RACH resources of different frequency bands may be assigned to respective cells. If the potential or candidate aggressor MUE transmits the random access preamble using random access resources of the macro cell due to the above described reason, information regarding the random access resources (i.e., information indicating which one of bands is frequency resources of the 6 RBs and other information indicating which subframe uses RACH resources should be transferred to the neighbor cell. That is, there is a need to transmit specific information to the neighbor cell. Here, the specific information indicates which one of subframes of a radio frame has been used for PRACH resources allocated for random access preamble transmission of the potential or candidate aggressor MUE during a predetermined time period. In addition, information regarding the random access preamble of the corresponding potential or candidate aggressor MUE may also be transmitted to the neighbor cell.

The neighbor cell, that has received random access resource information of the potential or candidate aggressor MUE and/or random access preamble configuration information from the marco cell, may not allocate RBs corresponding to the received random access resource information for a random access operation of a UE served by the neighbor cell itself, or may not use the same random access preamble sequence, such that interference generated in the random access preamble signal of the potential or candidate aggressor MUE for detection of the aggressor MUE can be reduced or mitigated.

B-2) Interference Reduction Method when Uplink Channel Sounding Scheme is Used for Detection of Aggressor MUE When an uplink sounding reference signal (SRS) is transmitted to the potential or candidate aggressor MUE so as to detect the aggressor MUE by the pico cell, the macro cell informs the pico cell of legacy SRS configuration information of the potential or candidate aggressor MUE, such that the pico cell receives the SRS signal transmitted from the potential or candidate aggressor MUE to the macro cell, and the macro cell can detect an aggressor MUE that causes interference to the pico cell. In this case, in order to correctly receive the SRS of the potential or candidate aggressor MUE by the pico cell, UEs of the neighbor cells may not use radio resources used for SRS transmission. However, because a general UE for use in the LTE system uses radio resources located at the last symbol of an uplink subframe commonly used between cells so as to perform uplink SRS transmission, the potential or candidate aggressor MUE may have difficulty in controlling frequency-time radio resources used for SRS transmission in a manner that a UE of the neighbor cells is unable to use the frequency-time radio resources.

In order to solve the above problem, the potential or candidate aggressor MUE establishes an SRS comb configuration value different from a value used by a UE of the neighbor cells such that the SRS comb configuration value can indicate whether the potential or candidate aggressor MUE uses an odd subcarrier or an even subcarrier for SRS transmission during SRS transmission, such that interference applied to the corresponding SRS signal can be minimized. In accordance with another scheme, SRS comb configuration values of UEs of the neighbor cell are fixed to a specific value during a time duration of uplink channel sounding of the potential or candidate aggressor MUE for detection of an aggressor MUE, and a value different from the SRS comb configuration value of the neighbor cell UEs is designated to perform SRS transmission of the potential or candidate aggressor MUE, such that the potential or candidate aggressor MUE can transmit SRS using subcarriers different from those of SRS of the neighbor UE, resulting in reduction of interference of the corresponding signal.

B-3) Interference Mitigation Method when DMRS is Used for Detection of Aggressor MUE UL Demodulation Reference Signal (DMRS) may be used to demodulate data transmitted from a UE to the serving cell. Therefore, the UL DMRS signal must be transmitted along with UL transmission data. In case of PUSCH transmission in which the UE transmits uplink data in 3GPP LTE, UL DMRS is transmitted to the fourth symbol of each UL slot. However, when the potential or candidate aggressor MUE transmits the UL DMRS so as to search for the aggressor MUE by the small cell, and when the potential or candidate aggressor MUE does not transmit UL data, the remaining symbols other than the fourth symbol of RBs used for UL DMRS transmission do not transmit data such that the remaining symbols may be wasted.

In order to solve the above described problem, when the potential or candidate aggressor MUE transmits a UL DMRS signal for detection of the aggressor MUE, the UL DMRS signal can also be transmitted at the remaining symbols other than the fourth symbol, such that several potential or candidate aggressor MUEs can simultaneously transmit the UL DMRS signal within one RB. That is, when the corresponding cell uses a normal CP, a total of 7 potential or candidate aggressor MUEs can simultaneously transmit the DMRS signal within one RB. When the corresponding cell uses the extended CP, a total of 6 potential or candidate aggressor MUEs can simultaneously transmit the UL DMRS signal within one RB. In this case, the potential or candidate aggressor MUEs configured to transmit the UL DMRS within the same RB may transmit the DMRS at different symbol positions of the corresponding RB.

To accomplish the above operation, a subframe number (index) for UL DMRS transmission of the potential or candidate aggressor MUE, resource allocation information regarding allocation information of RBs used for transmission of the UL DMRS, and information regarding the transmitted sequence value may be transmitted to the neighbor cells including the pico cell configured to receive interference from a current aggressor MUE. The neighbor cells having received the above information may not transmit a signal to an RB though which the potential or candidate aggressor MUE transmits the corresponding UL DMRS to a current connected UE, or may not transmit the same sequence information, resulting in interference reduction of the corresponding signal.

As described above, the scheme for enabling the UE to transmit the UL DMRS signal not only at a fixed specific OFDM symbol (e.g., $4^{th}$ OFDM symbol) but also the remaining symbols other than the fixed OFDM symbol can be utilized not only for detection of the aggressor MUE but also for other various purposes. That is, the eNB may give semi-static indication (including the corresponding DMRS sequence generation parameters, e.g., virtual-cell ID, etc.) to the DMRS configuration for DMRS transmission and the resultant DMRS configuration is then transferred to a UE, so that specific information indicating which one of OFDM symbols (or SC-FDMA symbols) was used for such UL DMRS transmission through higher-layer signaling such as RRC signaling can also be transferred to the UE, and the UE may transmit the UL DMRS to the established specific symbol position at the semi-statically established transmission time. Alternatively, specific information as to which one of symbol positions will be used for UL DMRS transmission through dynamic indication may be indicated through a DCI. The above described scheme may also be used for DMRS transmission so as to substitute for an SRS under the situation of insufficient SRS capacity.

It is obvious to those skilled in the art that the scheme for transmitting the UL DMRS proposed by the present invention to a specific OFDM symbol (SC-FDMA symbol) can be applied not only to PUSCH DMRS but also to PUCCH DMRS using similar scheme/signaling. That is, in case of a PUCCH, a symbol position to which UL DMRS is mapped, and a DMRS sequence generation method may be differently established according to PUCCH formats, such that the serving cell may perform independent DMRS configuration for each PUCCH format, and may semi-statically indicate the position of a specific OFDM symbol (SC-FDMA symbol) for DMRS transmission through RRC signaling or may also indicate the specific OFDM symbol position through a DCI. In addition, common signaling may also be applied to all or some of PUCCH formats as necessary.

C) Sounding Signal Transmission Resource Configuration and Allocation Method Per eNB For convenience of description, a transmission signal for detecting the aggressor MUE is referred to as a sounding signal. The sounding signal may be any one of legacy uplink Tx signals, i.e., a random access preamble, SRS, and DMRS. Differently from this sounding signal, the sounding signal may be a newly designed uplink Tx signal. A sequence used for creation of the sounding signal may be differently generated according to cell IDs. The sounding signal is received by the neighbor cells, such that it can be recognized whether a UE that decides a certain eNB as a serving eNB has transmitted the corresponding sounding signal. That is, the neighbor cells receive the sounding signal, such that the neighbor cells can recognize which eNB has permitted sounding signal transmission to the UE having transmitted the sounding signal.

After the eNB receives the sounding signal, if a Rx power level of the received sounding signal is equal to or higher than a predetermined level, the UE may inform the eNB having permitted the corresponding sounding signal transmission of the corresponding fact along with a Rx power level, frequency/time resources, sequence information of the received sounding signal, etc.

In order to efficiently mitigate interference between the neighbor cells after recognition of the aggressor MUE, eNBs of the coordinated cluster may construct a synchronized network which is synchronized with a start time of the subframe at a predetermined level or higher. According to the proposed scheme, all eNBs contained in the coordinated cluster may determine the same frequency/time resources of a predetermined region to be resources of the sounding signal transmission, and the frequency/time resources are not used for transmission of other signals. For example, a single sounding signal transmission subframe may be designated per 20 subframes, and specific RBs of the corresponding subframe may be designated for transmission of the sounding signal. In accordance with the proposed scheme, the eNBs may permit the UE to transmit the sounding signal only to resources designated as sounding signal transmission resources, and may attempt to receive/detect only the corresponding resources.

In association with resources designated as sounding signal transmission resources, the eNBs contained in the coordinated cluster may not use the resources for PUSCH or PUCCH transmission, and may schedule sounding signal transmission. If N eNBs are present in the coordinated cluster, and if all the N eNBs schedule sounding signal transmission to a specific UE from among UEs contained in the potential or candidate aggressor MUEs in UEs served by the N eNBs, N UEs contained in the coordinated cluster can transmit the sounding signal. In this case, interference occurs between the transmitted sounding signals, such that it is difficult to detect the sounding signal transmitted by the potential or candidate aggressor MUE contained in the neighbor cells. In order to solve this problem, only M eNBs from among N eNBs of the coordinated cluster can grant sounding signal transmission to the served UEs in association with Tx resources of one sounding signal. In this case, M may be set to 1. In order to select M eNBs from among N eNBs, the following schemes are proposed.

A scheme based on a random number is proposed as a first scheme. Each eNB generates a random number for each Tx resource of the sounding signal. If a predetermined condition is satisfied, each eNB may transmit the sounding signal to the served UE through the corresponding resources.

For example, if a random number evenly distributed from 0 to 1 is less than a threshold value (e.g., M/N), each eNB may permit the served UE to transmit the sounding signal at a specific resource (i.e., resources designated for transmission of the aforementioned sounding signal). Otherwise, resource transmission to a certain UE is not permitted at the specific resource, and detection of the sounding signal capable of being transmitted by a UE of the neighbor cell is attempted.

In accordance with this scheme, the sounding signal can be transmitted on average to the served UE from among M eNBs of N eNBs. In this case, a threshold value for comparison of random numbers may be differently established according to eNBs of the coordinated cluster. That is, if macro, micro, and pico cells are distributed in the coordinated cluster, and if a macro cell eNB is decided, many potential or candidate aggressor UEs are present, so that the threshold value may relatively increase. If the micro cell eNB is decided, and if a small number of potential or candidate aggressor UEs are present, the threshold value is reduced or mitigated. In addition, the threshold value may be changed according to the number of active UEs of each cell. That is, if the eNB includes a large number of UEs, the threshold value increases, so that the number of opportunities of sounding signal transmission permission increases. On the contrary, if the eNB includes a small number of UEs, the threshold value decreases, so that the number of opportunities of sounding signal transmission permission is reduced. In this case, the threshold value should be changed according to load variation of eNBs, a central controller of the coordinated cluster decides the threshold value by reflecting load of each cell, so that the decided threshold value is notified to each eNB.

A fixed scheme is proposed as a second scheme. The second scheme can predetermine which resource is used for sounding signal transmission permission for the served UE for each eNB from among resources of the total sounding signals of the coordinated cluster. As a representative example, the center controller of the coordinated cluster may decide total sounding signal Tx resources, and indicate which resource is used for transmission permission of the sounding signal for each eNB. That is, the total sounding signal Tx resource is divided into N resource regions, and which one of N resource regions will be used for sounding signal transmission permission for the served UE. Accordingly, s specific eNB may schedule the served UE such that a resource region in which transmission permission of the sounding signal is possible can be scheduled.

If N eNBs are present in the coordinated cluster, the N resource regions may be evenly allocated to the N eNBs on a one to one basis. Alternatively, although the N eNBs are present in the coordinated cluster, the N resource regions may be unevenly allocated to all eNBs. That is, similar to threshold decision shown in the first method, the number of resource regions allocated to each eNB may be determined on the basis of load of each eNB (i.e., the number of serving UEs). For example, a relatively large number of resource regions may be allocated to the eNB having many serving UEs.

On the contrary, assuming that the number of available resource regions of each eNB is unevenly decided, the eNB to which a resource region for the sounding signal transmission is not allocated may be present. In this case, the eNB to which the resource region is not allocated may attempt to detect the sounding signal from UEs served by other eNBs.

FIG. 6 is a flowchart illustrating a method for measuring inter-cell interference in a wireless communication system according to one embodiment. Referring to FIG. 6, the BS (or eNB) may receive information regarding a predetermined resource region to which the sounding signal allocated for UEs connected to BSs contained in the same coordinated cluster can be transmitted in step S610. The sounding signal may be used to detect a UE causing inter-cell interference. The predetermined resource region information may be established by the center controller or may be promised between the BSs. In addition, the predetermined resource region may be a resource region for a specific signal defined in 3GPP LTE. The predetermined resource region may be applied to all BSs contained in the coordinated cluster, such that information regarding the resource region allocated for sounding signal transmission need not be exchanged between the BSs.

The BS may determine whether transmission of the sounding signal can be permitted (or granted) for the served UE within the predetermined resource region in step S620. In other words, the BS may determine whether the predetermined resource region is available for the serving UE of the BS. In more detail, resources of the sounding signal are predetermined, such that it is determined which BS can allocate the corresponding resource region or some parts thereof for the serving UE of the BS within a predetermined resource region.

If it is impossible to permit transmission of the sounding signal, the BS can transmit a grant message for permitting the sounding signal transmission to the serving UE in step S630. Otherwise, the BS may attempt to detect the sounding signal(s) transmitted from the serving UE of the neighbor BS(s) in step S640.

Detailed description of the step S620 may satisfy at least some parts of the embodiment(s) of the present invention.

Figure 7:
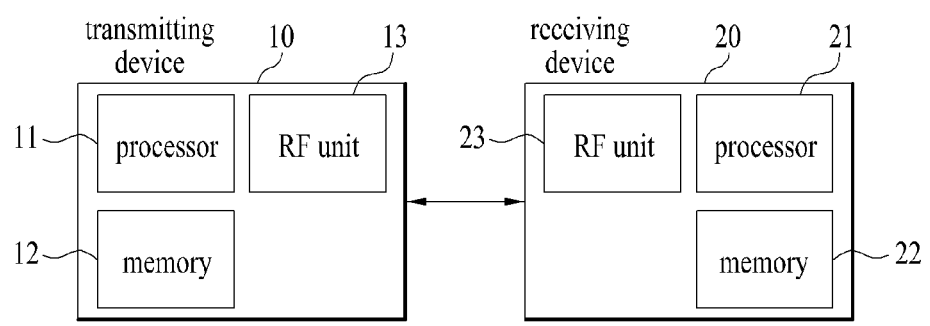
FIG. 7 is a block diagram illustrating a device for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a UE, a relay, an eNB, etc.

The invention claimed is:

1. A method for measuring inter-cell interference at a base station (BS) in a wireless communication system, comprising:
    receiving information regarding a predetermined resource region to which a sounding signal allocated for user equipments (UEs) connected to BSs in the same coordinated cluster is transmitted, the sounding signal being used to detect a UE causing inter-cell interference;
    determining whether transmission of the sounding signal is granted for a serving UE in the predetermined resource region; and
    if transmission of the sounding signal is granted, transmitting a transmission grant message of the sounding signal to the serving UE,
    wherein whether the sounding signal transmission is granted is determined on the basis of a random number, or is determined on the basis of information of an available resource region of each BS if information regarding the available resource region of each BS is received with the information regarding the predetermined resource region.

2. The method according to claim 1, wherein the determining whether transmission of the sounding signal is granted includes:
    generating a random number within a predetermined range; and
    comparing the random number with a threshold value,
    wherein, if the random number is lower than the threshold value, transmission of the sounding signal is granted.

3. The method according to claim 2, wherein the threshold value is BS-specifically changed.

4. The method according to claim 2, wherein the threshold value increases in proportion to the number of UEs served by the BS.

5. The method according to claim 1, further comprising:
    receiving a measurement result for the sounding signal from a neighbor BS.

6. The method according to claim 5, wherein the measurement result is received when reception (Rx) power of the sounding signal is equal to or higher than a predetermined level, and the measurement result includes a reception (Rx) power level, time/frequency resources, and sequence information of the received sounding signal.

7. The method according to claim 5, further comprising:
    allocating radio resources not used by the neighbor BS to the serving UE having transmitted the sounding signal.

8. The method according to claim 1, further comprising:
    if transmission of the sounding signal is not granted, attempting to detect a sounding signal transmitted from a UE served by neighbor BSs in the predetermined resource region.

9. A base station (BS) for measuring inter-cell interference in a wireless communication system comprising:
    a radio frequency (RF) unit; and
    a processor configured to control the RF unit,
    wherein the processor receives information regarding a predetermined resource region to which a sounding signal allocated for user equipments (UEs) connected to base stations (BSs) contained in the same coordinated cluster is transmitted, the sounding signal being used to detect a UE causing inter-cell interference; determines whether transmission of the sounding signal is granted for a serving UE in the predetermined resource region; and if transmission of the sounding signal is granted, transmits a transmission grant message of the sounding signal to the serving UE,
    wherein whether the sounding signal transmission is granted is determined on the basis of a random number, or is determined on the basis of information of an available resource region of each BS if information regarding the available resource region of each BS is received with the information regarding the predetermined resource region.

10. The base station (BS) according to claim 9, wherein the processor is configured to generate a random number within a predetermined range, and compares the random number with a threshold value, wherein, if the random number is lower than the threshold value, the processor is configured to grant transmission of the sounding signal.

11. The base station (BS) according to claim 10, wherein the threshold value is BS-specifically changed.

12. The base station (BS) according to claim 10, wherein the threshold value increases in proportion to the number of UEs served by the BS.

13. The base station (BS) according to claim 9, wherein the processor is configured to receive a measurement result for the sounding signal from a neighbor BS.

14. The base station (BS) according to claim 13, wherein the measurement result is received when reception (Rx) power of the sounding signal is equal to or higher than a predetermined level, and the measurement result includes a reception (Rx) power level, time/frequency resources, and sequence information of the received sounding signal.

15. The base station (BS) according to claim 13, wherein the processor is configured to allocate radio resources not used by the neighbor BS to the serving UE having transmitted the sounding signal.

16. The base station (BS) according to claim 9, wherein:
if transmission of the sounding signal is not granted, the processor is configured to attempt to detect a sounding signal transmitted from a UE served by neighbor BSs in the predetermined resource region.

17. A user equipment (UE) for measuring inter-cell interference in a wireless communication system comprising:
a radio frequency (RF) unit; and
a processor configured to control the RF unit,
wherein the processor is configured to receive a transmission grant message of a sounding signal for detecting a user equipment (UE) causing inter-cell interference from a serving base station (BS), and is configured to transmit the sounding signal according to the transmission grant message,
wherein the transmission grant message indicates transmission of the sounding signal within a predetermined resource region to which a sounding signal allocated for UEs served by BSs contained in the same coordinated cluster is transmitted, and
wherein the transmission grant message is received if transmission of the sounding signal is granted, and
the transmission of the sounding signal is determined on the basis of a random number, or is determined on the basis of information of an available resource region of each BS if information regarding the available resource region of each BS is received with the information regarding the predetermined resource region.

* * * * *